United States Patent [19]
Gunter et al.

[11] Patent Number: 5,387,107
[45] Date of Patent: Feb. 7, 1995

[54] PERSONALIZED INTERACTIVE STORYBOOK AND METHOD OF TEACHING A READER A DESIRED BEHAVIORAL PATTERN

[76] Inventors: Larry J. Gunter, P.O. Box 637, Archer City, Tex. 76351; Tracie D. A. Williams, Pecanway, Wichita Falls, Tex.

[21] Appl. No.: 110,722

[22] Filed: Aug. 23, 1993

[51] Int. Cl.⁶ .............................................. G09B 19/00
[52] U.S. Cl. .................................... 434/238; 434/178
[58] Field of Search ............... 434/236, 238, 156, 178, 434/99; 281/19.1, 19.2; 40/159, 157, 124.2

[56] References Cited

U.S. PATENT DOCUMENTS

| | | |
|---|---|---|
| 2,484,895 | 10/1949 | Links . |
| 2,524,143 | 10/1950 | Smith . |
| 2,694,264 | 11/1954 | Seaton ................................ 434/156 |
| 2,919,502 | 1/1960 | Henry . |
| 2,946,137 | 7/1960 | Worth et al. ....................... 434/178 |
| 3,879,861 | 4/1975 | Grantham . |
| 3,892,427 | 7/1975 | Kraynak et al. .................. 281/15 R |
| 4,001,960 | 1/1977 | Holson ................................. 40/159 |
| 4,172,332 | 10/1979 | Holes et al. ......................... 40/159 |
| 4,752,230 | 6/1988 | Shimizu . |
| 5,025,581 | 6/1991 | Polzin ................................. 40/159 |
| 5,143,362 | 9/1992 | Doane et al. ....................... 270/1.1 |
| 5,169,316 | 12/1992 | Lorman et al. . |
| 5,190,316 | 3/1993 | Hefty .................................. 281/15.1 |
| 5,213,461 | 5/1993 | Kalisher .............................. 412/4 |
| 5,213,507 | 5/1993 | Ozrovitz ............................. 434/178 |

*Primary Examiner*—Paul J. Hirsch
*Assistant Examiner*—Jeffrey A. Smith
*Attorney, Agent, or Firm*—Richard C. Litman

[57] ABSTRACT

A story book for teaching desired behavioral patterns is disclosed. The story book includes a front and back cover, and a plurality of pages therebetween. The covers and pages are bound together in a conventional manner. The front cover may carry a title as well as an illustration relating to the main theme of the story book. Each page has text printed thereon accompanied by an illustration. The text communicates a message related to a desired behavioral pattern. The illustration preferably includes a character which may be personalized with the likeness of the reader. This may be accomplished by applying a photograph of the reader to certain of the pages. The photograph may be applied, for example, via a lightly tacky adhesive or a transparent pocket. Preferably, the photograph is cooperatively received by an arrangement of slots. Each page may further be provided with an illustrative environment in which the personalized character interacts. The reader, being associated with the personalized character, may mentally interact with the environment or setting illustrated. The interaction between the personalized character and the environment is purposed to encourage enthusiasm from the reader and to inspire the reader to repeatedly read the story book. Through repetition, the reader's learning of the desired behavioral patterns is enhanced.

7 Claims, 5 Drawing Sheets

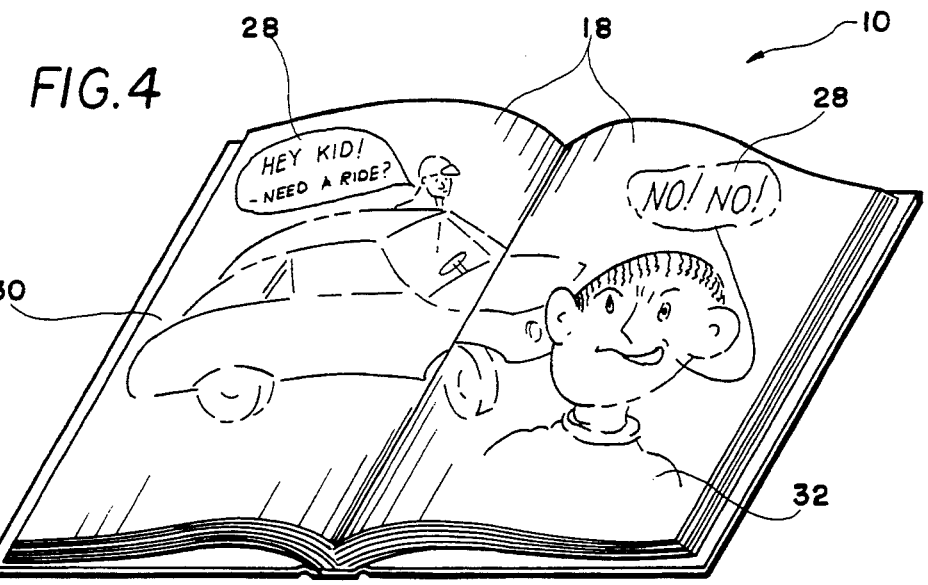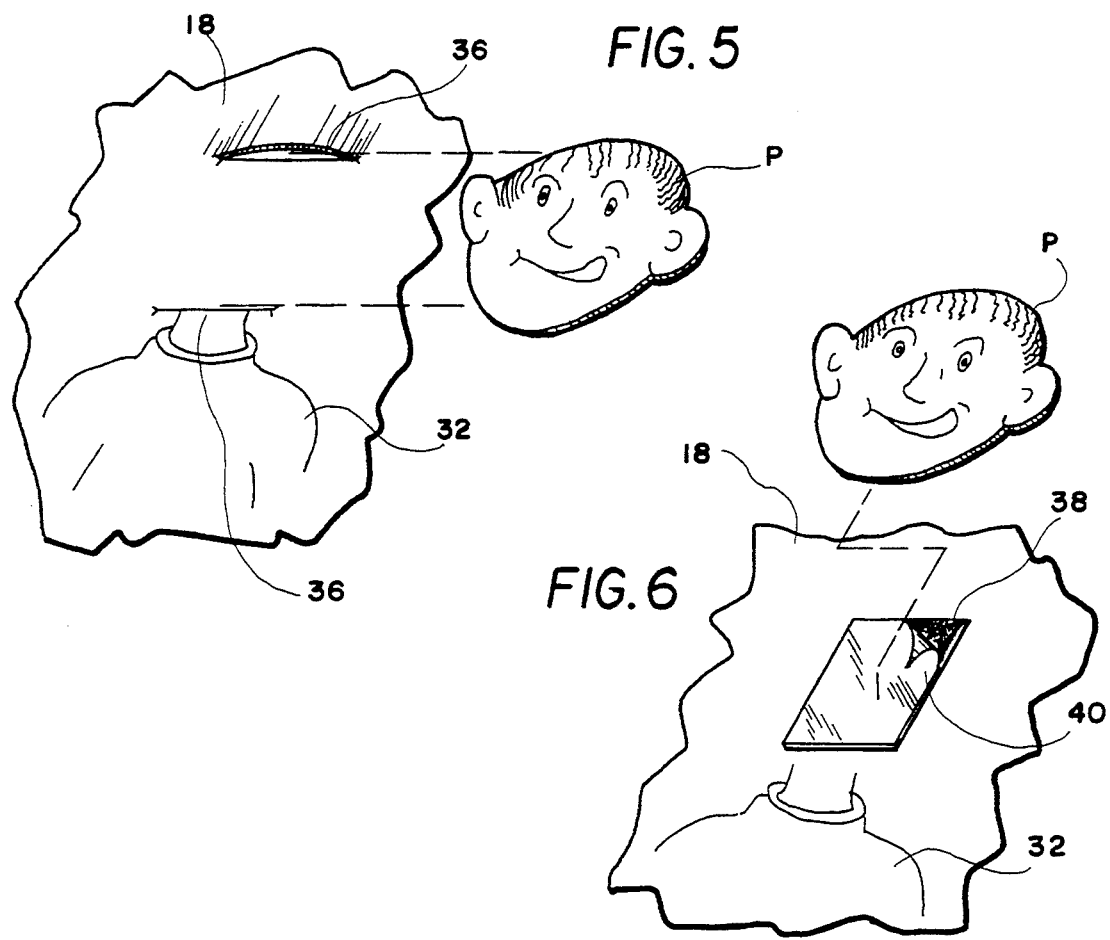

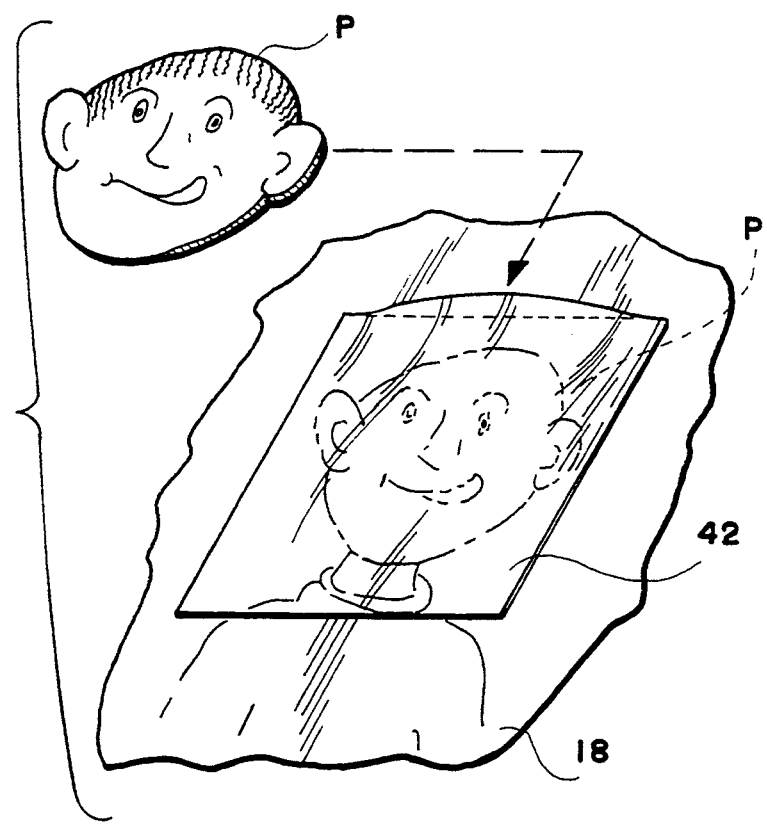
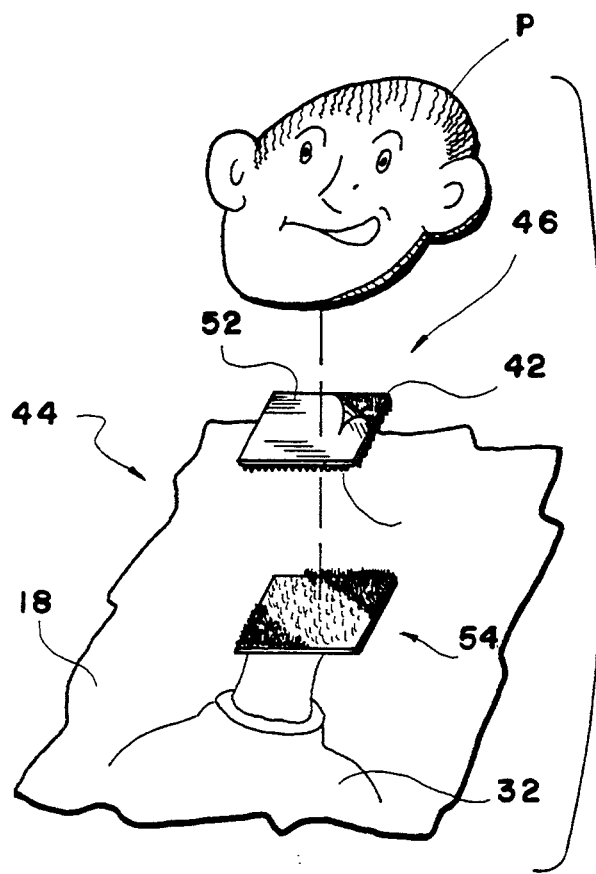

PERSONALIZED INTERACTIVE STORYBOOK AND METHOD OF TEACHING A READER A DESIRED BEHAVIORAL PATTERN

BACKGROUND OF THE INVENTION

1. Field of the Invention

The present invention relates to a picture book and, more particularly, to an interactive picture book which conveys messages to children, especially messages related to acceptable behavioral patterns.

2. Description of the Prior Art

Interactive reading enhances memory retention. Books which promote interactive participation of the reader are well known in prior patents. For example, U.S. Pat. No. 2,484,895, issued Oct. 18, 1949 to Julian A. Links, discloses an educational toy story book for children which combines pictures of principal characters as well as a physical representation of the principal characters. The book contains therein a story in the form of illustrations and a physical representation of the principal characters of the story, including different replaceable costumes.

Similar to the physical representation described by Links above, U.S. Pat. No. 2,919,502, issued Jan. 5, 1960 to Frances Henry, discloses a facial styling display device having a base upon which a variety of clothing articles may be applied. Also similar to that of Links, the device is for use in educating individuals. However, the device disclosed by Henry is for use in educating individuals in the development of a preference toward a good personal appearance. Various superposable sheets are readily, removably attachable to a base sheet via cooperatively engageable magnetic and metallic pieces. The various superposable sheets have thereon illustrations delineating facial features, hair, and wardrobe. The arrangement of the various sheets in different combinations permits the user to experiment with different combinations of appearances.

Another book is disclosed in U.S. Pat. No. 2,524,143, issued Oct. 3, 1950 to Willard D. Smith. Unlike Links and Henry above, Smith describes a book for use in expediting the learning process of children with respect to the recognition and meanings of words. The book has a plurality of pockets therein. Each Docket is configured to receive a phonograph record. Bound with each pocket is a page having visual material thereon for conveying a familiar story. Each record carries a sound track corresponding to the visual material on a respective page. The corresponding visual material may be carried out in a three-dimensional form.

Yet another book which combines visual and auditory medium is disclosed in U.S. Pat. No. 4,752,230, issued Jun. 21, 1988 to Yuichi Shimizu, describing a picture book which promotes auditory education. The book includes a front cover, a back cover, and a plurality of leaves therebetween. A thinly-built electronic musical instrument is integrally installed in the back cover of the book. The children are entertained by viewing the book and playing music printed on the leaves.

Another user interaction device is disclosed in U.S. Pat. No. 3,879,861, issued Apr. 29, 1975 to Frederick W. Grantham. Grantham discloses an educational game for analyzing different human characteristics. The game includes a rigid board member having recesses therein and a plurality of pieces which can be selectively positioned within the recesses in the board member. A main recess is configured to receive pieces arranged so as to depict the profile of a human head.

Still another patent which is deemed of interest is U.S. Pat. No. 5,169,316, issued Dec. 8, 1992 to Janis S. Lorman et al., disclosing a device for improving speech disorders by combining instructional indicia with a mirror for providing a direct visual feedback. The mirror is affixed to a central portion of a generally planar surface and the instructional indicia is printed on a peripheral portion of the planar surface about the mirror. Supplemental surfaces may be provided, each including additional instructional indicia.

None of the above inventions and patents, taken either singly or in combination, is seen to describe the instant invention as claimed.

SUMMARY OF THE INVENTION

The present invention is a story book which may be personalized with the reader's own likeness. The story book includes a front cover, a back cover, and a plurality of pages therebetween. The covers and the pages are bound together in a conventional manner in which books are bound. The front cover of the story book may carry indicia in the form of a title, as well as an illustration relating to a main theme being addressed therein or means to attached a likeness of the reader thereto. Each page has text printed thereon accompanied by an illustration of a character which may be personalized with the likeness of the reader. This may be accomplished by applying a photograph of the reader's likeness to each page. For instance, the photograph may be applied via a lightly tacky adhesive, or may be inserted into a transparent pocket, or may be cooperatively received by an arrangement of slots. Each page is further provided with an illustrative environment in which the personalized character interacts. The reader may associate himself or herself with the personalized character and, in turn, with the interactive environment. The interaction between the personalized character and the environment is purposed to teach the reader desired behavioral patterns. The personalized character is intended to encourage enthusiasm from the reader which further inspires the reader to repeatedly read the story book. Through repetition, the learning of the desired behavioral patterns by the reader is enhanced.

Accordingly, it is a principal object of the invention to provide a story book which may be personalized with the reader's likeness.

It is another object that each page of the story book have text printed thereon accompanied by an illustration of a character which may be personalized with the likeness of the reader.

It is a further object that each page be provided with an illustrative environment in which the personalized character interacts so as to permit the reader to associate himself or herself, as the personalized character, with the interactive environment.

Still another object is that the interaction between the personalized character and the environment teach the reader desired behavioral patterns.

Yet another object is that the personalized character be intended to encourage enthusiasm from the reader which inspires the reader to repeatedly read the story book and that through repetition, enhances the learning of the desired behavioral patterns by the reader.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4 is a perspective view of the story book shown in FIG. 1 in an opened posture.

FIG. 5 is a perspective view of an arrangement of slots for receiving a photograph of the reader.

FIG. 6 is a perspective view of a lightly tacky adhesive for applying a photograph of the reader to a respective page of the story book.

FIG. 7 is a perspective view of a transparent envelope for receiving a photograph of the reader.

FIG. 8 is a perspective view of a hook-and-loop type fastener for applying a photograph of the reader to a respective page of the story book.

Similar reference characters denote corresponding features consistently throughout the attached drawings.

DETAILED DESCRIPTION OF THE PREFERRED EMBODIMENTS

Figure 1:
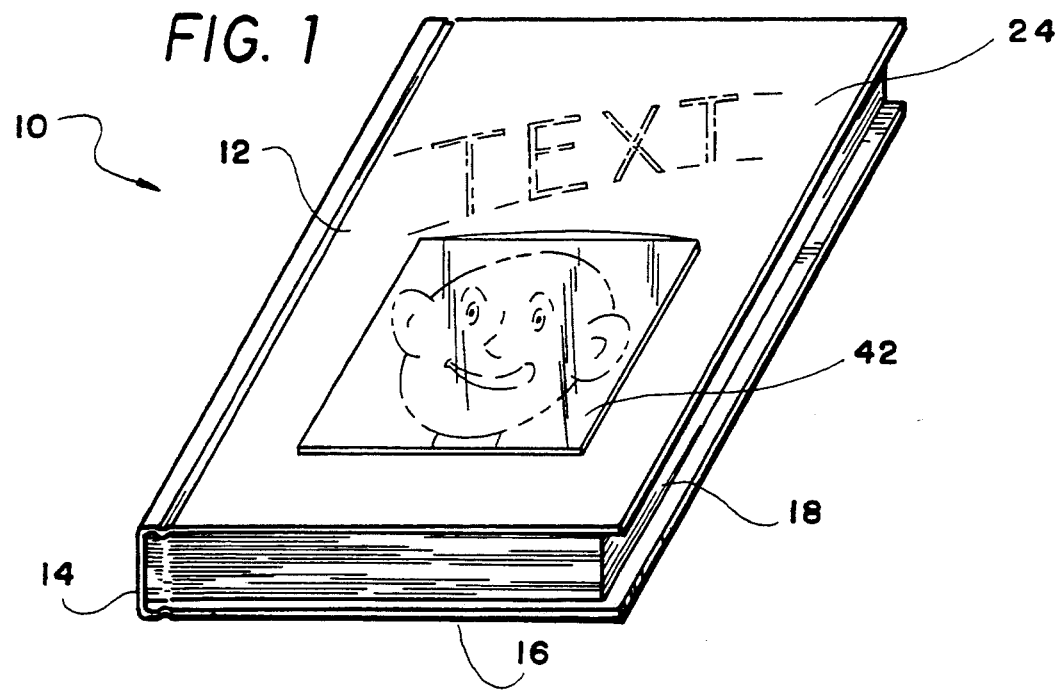
FIG. 1 is a front perspective view of a story book according to the present invention.
Figure 2:
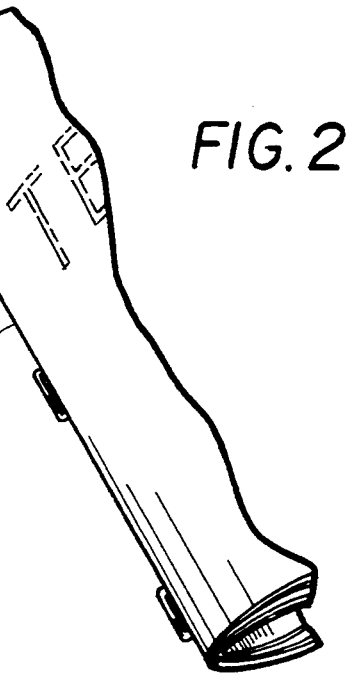
FIG. 2 is fragmentary view of the story book having a stapled backbone.
Figure 3:
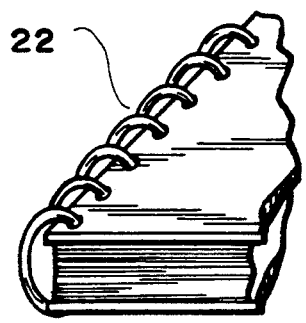
FIG. 3 is fragmentary view of the story book having a spiral backbone.

The present invention, as shown in FIG. 1, is a story book 10 having a front cover 12, a backbone 14, a back cover 16, and a plurality of pages 18. The front cover 12 and the back cover 16 may be either soft or hard. The pages 18 are successively positioned between the front cover 12 and the back cover 16, and are hinged via the backbone 14 for swinging in a usual manner for conventional books. Three examples of backbones are shown throughout FIGS. 1-3. The backbone 14 of FIG. 1 is conventionally hardbound, that shown in FIG. 2 is a stapled backbone 20, and in FIG. 3, a spiral backbone 22 is shown.

The front cover 12 preferably has text 24 printed thereon, such as a title relating to a main theme of the story book 10, and possibly an illustration, such as an illustration of one or more characters appearing in the story book 10 or means for attaching the likeness of the reader 42 thereto. A series of story books may be provided, each conveying a different theme. The themes may be related to wide range of topics, such as exercising safety, good manners, good personal hygiene, and responsibilities. Each story book 10 may include one or more stories relating to the same theme.

A story book delineating a safety related theme could include stories instructing the reader about interaction with strangers, such as stories about talking to strangers, accepting favors from strangers, and accepting gifts from strangers. A story book expressing a theme directed toward good manners may include, for example, a story about addressing others, respecting others, table manners, and/or eating habits, just to name a few.

There exist a large variety of themes and numerous stories which may relate to each theme. Stories may be directed to helping parents, friends and neighbors; giving and sharing; obeying authority figures and respecting elders; practicing good health habits; travel tips; cleanliness and organization; and learning patterns and skills, to name a few.

As is shown in FIG. 4, each page 18 includes text 28 and/or an illustration 30, 32. The text 28 appearing on each individual page 18 imparts some segment of one of the stories being expressed within the story book 10. Examples of story segments pertaining to a safety theme are as follows. With respect to talking to strangers, a story segment, such as is shown in EXAMPLE 1, may be included.

EXAMPLE 1

"Hey Kid. Come here a minute. I want to talk to you."

"No sir. I am sorry. I am not supposed to talk to strangers."

With respect to accepting favors from strangers, a story segment may appear as is shown in EXAMPLE 2 below.

EXAMPLE 2

"Hey, sonny. Do you need a ride?"

"No sir. I am not supposed to accept rides from strangers."

Yet another example is shown in EXAMPLE 3 which may be related to accepting gifts from strangers.

EXAMPLE 3

"Hey, little boy. Would you like a piece of candy?"

"No. No. No. I'm not supposed to accept gifts from strangers."

Segments such as these combined with other segments provide complete stories proclaiming lessons related to the theme being communicated.

The illustrations 30, 32 form of an environment or setting, and/or one or more interactive characters 30, as well as a personalized character 32. The interactive character or characters 30 may each represent a friend or foe. Each story book 10 may incorporate one or more of the reader's favorite story book, comic strip, or television characters or action figures (not shown) representative of the interactive characters 30. Each of the personalized characters 32 is personalized with the likeness of the reader. In this way, the reader may easily associate himself or herself with the illustrated environment or interactive characters 30 appearing on each page 18 making up a framework of the individual stories. This association encourages the child to read the story book 10 with enthusiasm and to apply the lessons being expressed to their lives.

Now referring to FIG. 5, the personalized character 32 is preferably personalized with the likeness of the reader by affixing a photograph P of the reader to the pages 18 on which the personalized character 32 appears. Preferably, each of the pages 18 on which the personalized character 32 appears has an arrangement of slots 36 for cooperatively receiving the photograph P of the reader. The reader's likeness is cut or trimmed out of a photograph P of the reader. The photograph P of the reader's likeness should be of such a size that portions of the same engage the slots 36 so as to be retained therein. An arrangement of this type permits the photograph P to be temporarily affixed to respective pages 18 of the story book when in use and, when not in use, the same may be removed and affixed to pages 18 in other similarly configured story books. A single set of photographs P may be utilized in each story book within a series of story books (not shown).

Alternatively, the likeness of the reader is affixed to the pages 18 on which the personalized character 32 appears via a lightly tacky adhesive 38, as is shown in FIG. 6. Prior to use, the adhesive 38 is protected by a release sheet 40. To apply the photograph P of the reader, simply peel off the release sheet 40 to expose the adhesive surface 38. Now, the photograph P of proper proportions may be appropriately applied to the page 18. It should be noted that the adhesive 38 is lightly tacky so as to permit the photograph P to be easily removed from the page 18 when and if so desired.

Yet another alternative means for affixing the likeness of the reader to the page 18 of the story book is shown in FIG. 7. In this embodiment, the photograph P of the reader's head is removably inserted into a transparent envelope or pocket 42 which is integrally attached to the page 18. The pocket 42 is dimensioned and configured to receive a photograph P of appropriate size. The pocket 42 is attached or fused to the page 18 in any number of well known conventional manners, such as heat sealing and gluing. Similar to that of the aforementioned slots 36 shown in FIG. 5, the photograph P may be easily removed and applied to the pages of other story books adapted to receive the same.

Still another embodiment may include hook and loop type fastener 44 for attaching a photograph P to a respective page 18, as is shown in FIG. 8. A first element 46 of the hook and loop type fastener 44 has an adhesive backing 48 opposite an engaging surface 50. The adhesive backing 48 is exposed by removing a release strip 52. After exposing the adhesive backing 48, the first element 46 is attached to the back of a photograph P of the reader's head. A second element 54 of the hook and loop type fastener 44, which is matingly engageable with the first element 46, is fixed to the page 18 in close proximity to the personalized character 32. The first element 46, having the photograph P of the reader's head attached thereto, is engaged with the second element 54 which, in turn, affixes the photograph P to the page 18. The photograph P may be removed and applied to the page 18 of another story book having the second element 54 of the hook and loop type fastener 44 attached thereto.

Figure 9:
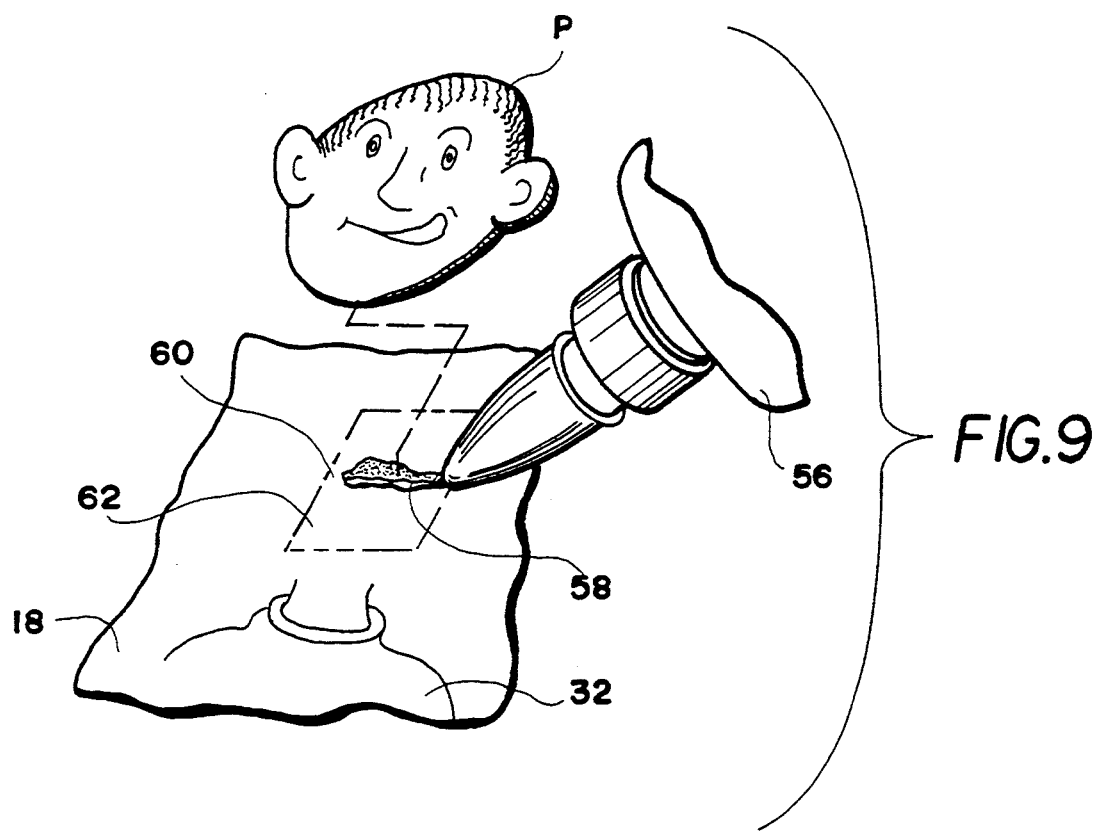
FIG. 9 is a perspective view of a photograph of the reader being applied to a respective page of the story book via a liquid adhesive.

FIG. 9 shows yet another embodiment. In this embodiment, the story book and a reservoir 56 of adhesive substance 58 are combined to form a kit. Certain pages 18 include an application area 60 marked about the periphery thereof with a peripheral boundary line 62. It is within this application area 60 that the adhesive substance 58, such as the liquid glue shown, is sparingly applied. After applying the glue 58, the photograph P is affixed to the page 18. The glue 58 preferably remains mildly tacky so as to permit the photograph P to be removed from the page 18 and reapplied to other story books. It should be noted that the bound application area 60 is not essential to the invention but would assist young children in placing the photograph P on the page 18 properly with respect to the personalized character 32.

In summary, the story book teaches the reader desired behavioral patterns and through the incorporation of the reader's personal photograph, the reader is permitted to associate himself or herself with the personalized character in the story book as well as the setting and the characters in which the personalized character interacts. This promotes the reader's interest and encourages use of the story book. Through repeated use of the story book, the learning of the desired behavioral patterns by the reader is greatly enhanced.

Figure 10:
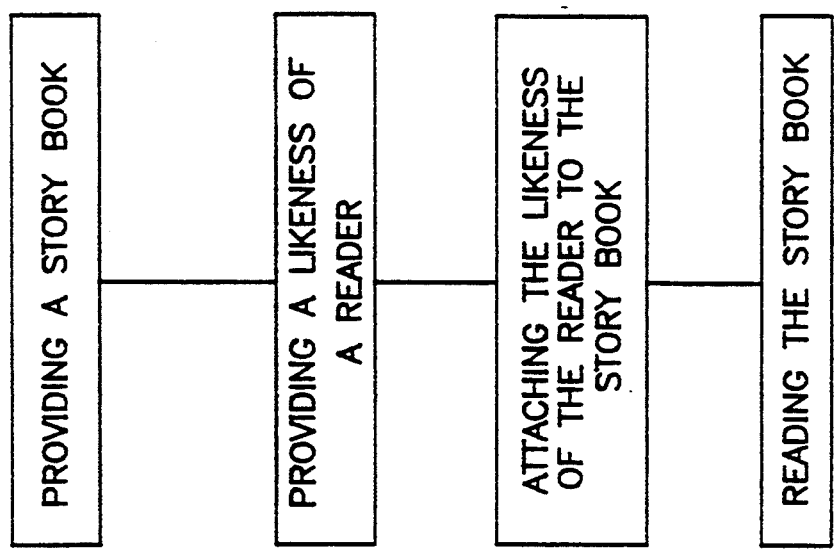
FIG. 10 is a block diagram representing a method for teaching children desired behavioral patterns.

To further increase the reader's interest and thereby, enhance the learning ability of the reader, the reader is encouraged to adhere the photographs of himself or herself to the pages of the story book. As illustrated in FIG. 10, this is accomplished by first providing photographs of the reader and, if need be, to cut out a desired portion of each photograph. It is critical that the photographs be of appropriate size, that is, proportionate to the personalized character. Having been provided with the photographs, the reader is then encouraged to affixed the photographs to the respective pages. The method of affixing the photographs to the pages would vary depending on the means in which the photograph is affixed (disclosed above). This active participation further increases the reader's association of himself or herself with the personalized character in the story book and hence, further enhances the reader's learning of the desired behavioral patterns.

It is to be understood that the present invention is not limited to the embodiments described above, but encompasses any and all embodiments within the scope of the following claims.

We claim:

1. An interactive story book for teaching children desired behavioral patterns, said story book comprising:
   a front cover;
   a back cover;
   a plurality of pages disposed between said front cover and said back cover, at least one of said plurality of pages having printed matter thereon in the form of text and at least one of said plurality of pages having printed matter thereon in the form of an illustration;
   means for hingedly binding said front cover, said back cover, and said plurality of pages together; and
   means for affixing a likeness of a reader to at least one of said plurality of pages, said affixing means including an adhesive surface on which said likeness of the reader may be applied, and a release strip for concealing said adhesive surface, said release strip being removable to reveal said adhesive surface.

2. The story book according to claim 1, wherein said front cover further includes means for affixing the likeness of the reader thereto.

3. The story book according to claim 1, wherein said binding means includes a spiral type binding.

4. The story book according to claim 1, wherein said front cover and said back cover are integral with one another and wherein said binding means includes a plurality of staples holding said front cover, said back cover, and said plurality of pages together.

5. The story book according to claim 1, wherein at least one of said illustrations includes a character in the form of a headless human figure and said affixing means is disposed above an upper torso of said headless human character, and wherein the likeness of the reader includes a photograph of the reader's head.

6. A method for teaching a reader a desired behavioral pattern, said method comprising the steps of:
   providing a story book having a plurality of pages and including a story therein related to a theme intended to teach a reader a desired behavioral pattern;
   providing a likeness of the reader;
   attaching a likeness of the reader to certain of the plurality of pages; and
   reading the story book.

7. A method for teaching a reader desired behavioral patterns, said method comprising the steps of:
   providing a story book having a plurality of pages and including a plurality of stories therein related to a theme intended to teach a reader desired behavioral patterns;
   providing a likeness of the reader;
   attaching the likeness of the reader to certain of the plurality of pages; and
   reading the story book.

* * * * *